June 11, 1963 J. J. REED 3,092,912
TAPE EXTENSOMETER FOR MEASURING ROOF SAG
Filed Aug. 1, 1960 2 Sheets-Sheet 1
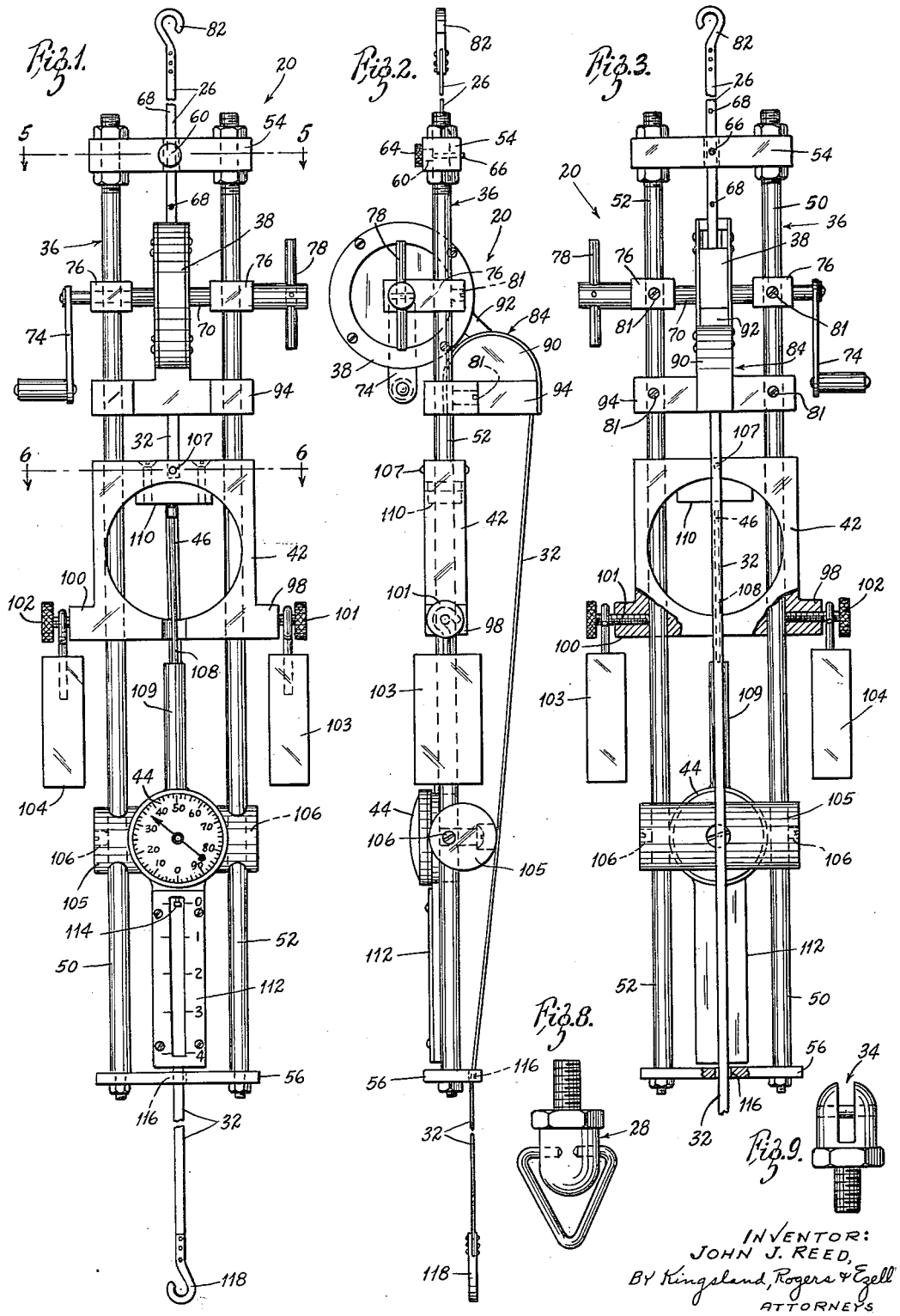
INVENTOR:
JOHN J. REED,
BY Kingsland, Rogers & Ezell
ATTORNEYS

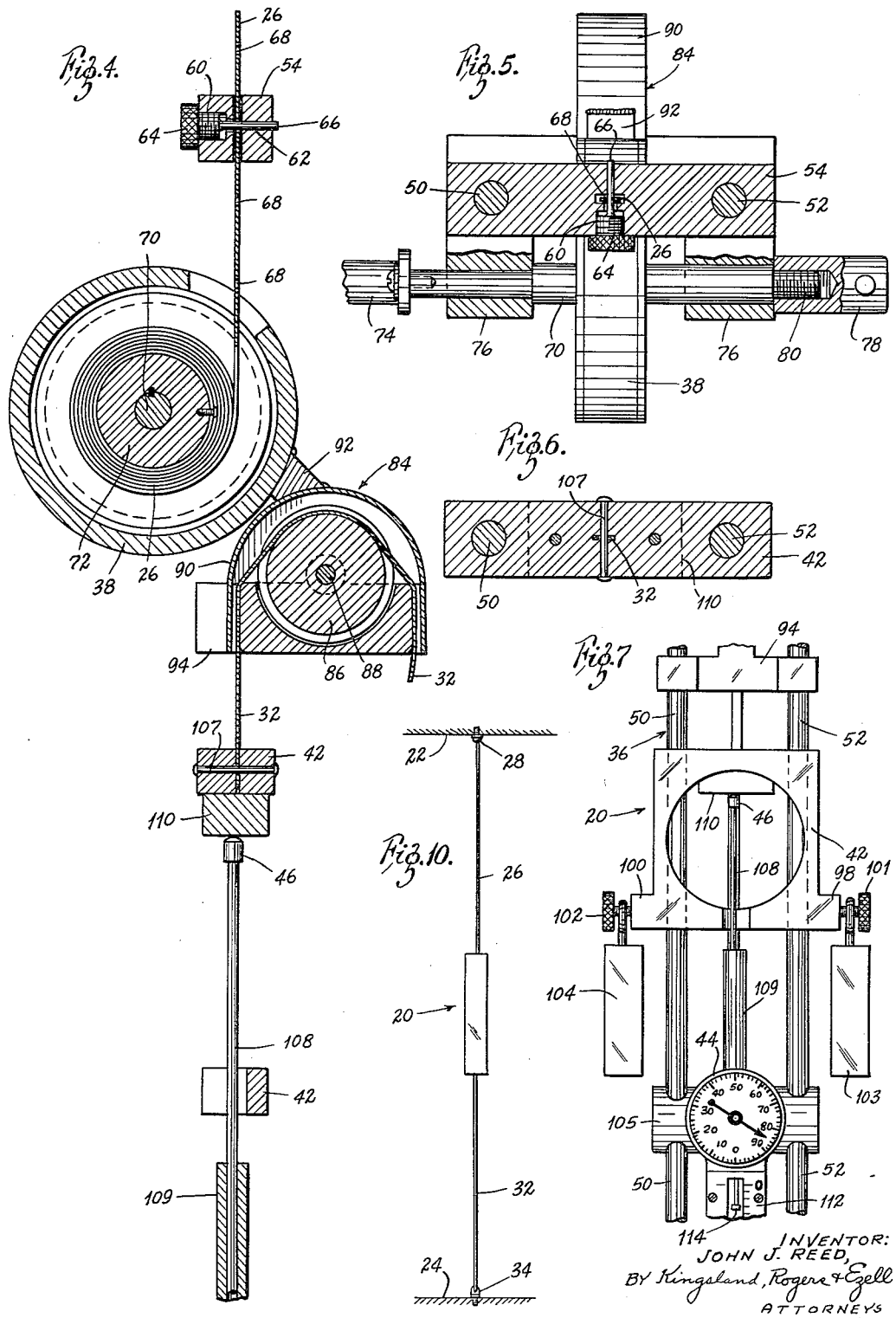

United States Patent Office 3,092,912
Patented June 11, 1963

3,092,912
TAPE EXTENSOMETER FOR MEASURING ROOF SAG
John J. Reed, Flat River, Mo., assignor to St. Joseph Lead Company, New York, N.Y., a corporation of New York
Filed Aug. 1, 1960, Ser. No. 46,426
11 Claims. (Cl. 33—147)

This invention relates to improvements in devices for measuring roof sag and, in particular, is concerned with a tape extensometer that may be connected between a roof and a floor to measure sag.

It is very important in various fields, including mining and the construction trades, to measure the sag between a roof and a floor. Particularly in the mining industry sag must be measured to determine safe levels of operation. This sag in mine tunnels and the like must be measured conveniently, simply, and to a high degree of accuracy in the range of thousandths of an inch. It is desired to be able to take the measurements simply in order to provide a full range of application of the instruments under varying conditions.

By means of the instant invention there has been provided a tape extensometer in which the effective length of the tape may be varied by playing the tape out or extending it from a reel in order to measure the relative elevation between a roof and a floor. Essentially, the tape extensometer employs a frame upon which the tape reel is rigidly secured, but in which the tape can be played out to various lengths to accommodate initial installations in ceilings of widely varying heights. The extensometer further employs a floor tape entirely separate from the roof tape and which is of a fixed length. This tape is connected at one end to the floor and, after being passed over a pulley rigidly connected to the extensomer frame, is secured to a counterweight. The counterweight is free to move relative to the extensometer frame and contacts a movable dial plunger which indicates roof sag.

The above noted arrangement makes possible, by movement of the plunger due to the counterweight movement upon sage of the roof, to measure directly the degree of sag. The extensometer frame is kept under tension by means of a constant dead weight due to the weight of the counterweight and is not subject to misalignment or disrepair due to change in force of springs which are entirely avoided. Further, by the use of a fixed length of a floor tape, a dial may be positioned upon the frame at a standard level so that it may be easily viewed by an operator taking measurements. The parts employed upon the extensometer frame can be very simply installed and can be removed from tracks of the frame upon which they are positioned should repair be required. Also, substitution of parts to provide for different ranges can be made due to the convenience of construction of the device.

It is accordingly a principal object of this invention to provide a tape extensometer for measuring relative change between a floor and ceiling in which the extensometer device is supported from a ceiling by a roof tape and is connected to a floor by a floor tape passing over a pulley carried upon the extensometer and being connected to a constant weight counterweight.

It is a further object of this invention to provide a tape extensometer in which an extensometer frame is carried by a roof tape, which may be played out to various lengths, and in which the entire device is carried by the roof tape that is connected to the frame in supporting relation by a securing means securing the roof tape to the frame in a positive fashion preventing slippage.

Still a further object of this invention is to provide a tape extensometer having an extensometer frame and adapted to be supported from a roof in which the device is kept under tension by a counterweight connected to the floor by a fixed length floor tape passing over a pulley carried by the frame, and in which the counterweight is carried upon a freely moving guide frame riding upon tracks of the extensometer frame and whereby movement of the counterweight causes movement of a dial plunger to provide a direct reading of roof sag.

Yet another object of this invention is to provide a tape extensometer comprising a simple extensometer comprising a simple extensometer frame having a pair of tracks upon which a roof tape reel frame can be removably secured together with a removably secured dial structure and a counterweight frame that can be locked in position or be made relatively movable upon the tracks.

Still another object of this invention is to provide a tape extensometer, which is made of simple components, that is rugged in construction and can be readily operated by relatively unskilled operators with a high degree of accuracy.

Further objects of this invention will appear in the detailed description which follows and will be otherwise apparent to those skilled in the art.

For the purpose of illustration of this invention, there is shown in the accompanying drawings a preferred embodiment. It is to be understood that these drawings are for the purpose of example only and that the invention is not limited thereto.

In the drawings:

FIGURE 1 is a front elevation view of the tape extensometer;

FIGURE 2 is a view in side elevation taken from the right side of FIGURE 1;

FIGURE 3 is a view in rear elevation of the tape extensometer;

FIGURE 4 is an enlarged view in vertical section showing the operaing relationship of the tape reel, the dial plunger, and the counterweight pulley;

FIGURE 5 is an enlarged view in section taken on the line 5—5 of FIGURE 1 showing the means for pinning the tape to the frame of the extensometer;

FIGURE 6 is an enlarged view in section taken on the line 6—6 of FIGURE 1 showing the structural relationship between the counterweight frame and the frame of the tape extensometer;

FIGURE 7 is a fragmentary view in front elevation taken similarly to FIGURE 1 but showing a different position of the parts indicating the relative movement between the counterweight frame and the tape extensometer frame to compensate and indicate for sag in the roof which is being measured;

FIGURE 8 is a view in elevation of a roof plug to which the tape extensometer may be attached;

FIGURE 9 is a view in elevation of a floor plug to which the tape extensometer may be attached; and FIGURE 10 is a schematic view showing the tape extensometer set up and connected between a tunnel roof and floor.

The tape extensometer is generally indicated by the reference numeral 20 in the schematic diagram of FIGURE 10 where it is shown connected to a roof 22 and a floor 24 of a roof and floor to be measured, such as in a mine tunnel or the like. As there shown, the tape extensometer is connected to a roof tape 26 which can be adjusted to any convenient desired length. The other end of the roof tape is attached to a roof plug 28. The bottom of the tape extensometer is connected through a fixed length floor tape 32 to a floor plug 34. It will be understood, as more clearly brought out below, that the bottom end of the roof tape 26 is rigidly attached to the tape extensometer. On the other hand, the free end of the floor tape 32 is connected over a counterweight pulley rigidly connected to the extensometer to a movable counterweight device to compensate for relative movement between the floor and the roof and to provide for indication of the change upon the dial carried by the tape extensometer.

Referring now to FIGURES 1, 2 and 3, the main components of the tape extensometer comprise a frame 36 having a pair of tracks, a reel 38 for the roof tape, a counterweight carriage or frame 42 slidable upon the extensometer frame, a dial 44, and a movable dial plunger 46. These components, together with the roof tape 26 and the floor tape 32, comprise the major features of the tape extensometer.

The extensometer frame 36, as shown in FIGURES 1, 2 and 3, is made up of a pair of elongated tracks 50 and 52, which are secured at the top and bottom by a top plate 54 and a bottom plate 56, respectively. The plates may be removed from the tracks in order that the various components of the tape extensometer may be simply installed upon the tracks and removed therefrom very conveniently where maintainence should be required.

The top plate 54, as more particularly shown in FIGURE 4, is provided with a threaded bore 60 and a smaller bore hole 62 to receive a locking pin 64. The locking pin is adapted to be inserted into the top plate in such a manner that the stud 66 is pinned through openings 68 contained at regular intervals, such as four inches or so, in the roof tape 26. This feature makes it possible to extend the tape at varying lengths to accommodate roofs of different heights, and still be relocated precisely when repeating previous measurements.

The reel 38 carrying the roof tape is supported upon a reel shaft 70. This shaft is locked to a reel drum 72 and communicates with a reel handle 74 in order that the reel drum may be played out to various positions. The reel is carried upon a support 76 which rides upon the tracks 50 and 52. The reel may be locked in place by means of a locking handle 78 which is more particularly shown in FIGURE 5. The locking handle is threadedly engaged with a threaded extension 80 of the reel shaft 70 to lock the support against the reel. The support 76 is locked against the extensometer frame by means of setscrews 81 as shown in FIGURE 3.

From the construction of the tape reel 38 it will be understood that by proper operation of the handle 74 a desired length of the tape 26 may be reeled out. When the desired length has been dispensed, the tape reel may be locked by the operation of the lock handle 78. The tape may then be connected to the roof plug 28 by the hook 82 connected to the end of the roof tape.

The tape reel supporting frame 76 also supports a counterweight pulley 84 as best shown in FIGURES 2 and 4. The counterweight pulley, generally indicated by the reference numeral 84, comprises a pulley wheel 86 supported upon a pulley shaft 88 journaled in a pulley housing 90. The housing is rigidly connected by a brace 92 to the tape reel 38 as shown in FIGURE 4 and is also supported upon a guide member 94 that rides upon the extensometer tracks 50 and 52.

The counterweight frame 42 is best shown in FIGURES 1, 2 and 3, and in the fragmentary view of FIGURE 4. As there shown, it is comprised of a frame which rides upon the tracks 50 and 52. Counterweight extension members 98 and 100 extend from both sides of the frame and are adapted to receive adjustment screws 101 and 102, respectively. These adjustment screws are adapted to lock the frame in position against the tracks when the extensometer is stored, but are loosened to provide for free movement of the frame in operation. Counterweights 103 and 104 are suspended from the adjustment screws. The counterweight frame 42 also secures one end of the fixed floor tape 32 by means of a pin 107.

The dial 44 is best shown in FIGURES 1 to 3. As there shown, it is comprised of a dial graduated in one-thousandths of an inch indicated by means of a pointer. The dial is supported upon a support block 105 which may be locked upon the tracks 50 and 52 by setscrews 106. A contact dial plunger 108, which is adapted to be contacted by a contact element 110 mounted upon the counterweight frame, is positioned upon the top of the dial. The dial plunger is guided by a housing 109. This plunger, when moved downwardly, registers roof sag in one-thousandths of an inch upon the dial. The entire movement may be over a four inch limit. The four inch range may be indicated upon the rule 112, depending from the bottom of the dial. An indicating element 114 is connected to the plunger 108 through the instrument in order to give an indication of the rough adjustment in tenths of inches. Since the dial 44 is graduated in one-thousandths of an inch and reads up to one hundred, it will be understood that ten revolutions are required to move the indicating member 114 one inch upon the indicating rule 112, which can be graduated in tenths, as will be understood.

The threading of the floor tape 32 in the tape extensometer will now be described. As previously mentioned, one end of the tape is pinned by pin 107 to the counterweight frame 42. The other end is passed over the counterweight pulley 84, as shown in FIGURE 4, and is then threaded downwardly through a slot 116 in the extensometer frame bottom plate 56. This relationship is more particularly shown in FIGURE 3 and FIGURE 4. The free end of the floor tape 32 is provided with a hook 118 which is adapted to be hooked into the floor plug 34.

*Use*

The tape extensometer will first be described with respect to the position of its parts when the device is stored. In this condition all of the moving parts are locked in place on the frame so that they are rigidly secured to the tracks 50 and 52. In this condition the reel 38 will be wound up by means of the handle 74 so that the hooked end 82 of the roof tape will be drawn down against the top plate 54. The reel may be locked in position by the operation of the handle 78.

The reel supporting frame 76 and the guide 94 are locked in position upon the frame by the setscrews 81. Likewise, the dial is locked in place by the operation of a setscrew 106 upon the support block 105. Lastly, the counterweight frame 42 is locked in place upon the frame by moving it slightly upwardly from the position shown in FIGURE 1 in order that the contacting member 110 is freed from engagement with the plunger 108. In this position the counterweight frame 42 is locked in position upon the tracks 50 and 52 by operating the thumb screws 101 and 102. The counterweights 103 and 104 are, of course, removed when the device is stored.

In actual use a pair of support stations are first installed in a roof 22 and a floor 24, as shown in FIGURE 10. It will be understood that the roof plugs 28 and the floor plugs 34 are set up in sockets provided in direct vertical relationship one above the other. This provides for measuring the distance between the position of the sockets in a floor and roof, respectively, as in a mine tunnel, cave, building structure, or the like, wherever relative vertical differences are desired to be measured. It will further be understood that by daily measurements and noting the change in the daily measurements the degree of sag over a period of time, either daily or at more frequent intervals or at longer intervals, can be obtained. This gives an indication of the sag that is desired to be measured for safety purposes and the like.

In the actual set-up of the instrument the roof tape 26 is played out by loosening the lock 78. A sufficient amount of the roof tape is dispensed with the hook 82 hooked over the roof hook 28 to a point where the dial 44 is approximately at eye level for the average individual. It should be noted that the length of the floor tape 32 is fixed at a length that makes this possible.

Once the proper length has been determined the roof tape 26 is firmly connected to the extensometer to support it by inserting the pin 64 with the stud 66 fitting through one of the holes 68 in the tape. Should it be found that the tape is too long so that the contacting member 110 of the counterweight frame rides upon the plunger and is in danger of depressing it more than the four inch level, the roof tape can be reeled in another increment and shortened by inserting the pin 64 through another opening 68 closer to the hooked end. Conversely, should the contacting member 110 of the counterweight frame be positioned out of engagement and above the end of the dial plunger 108 the tape should be lengthened until some depression occurs.

It will accordingly be seen that there is provision for variation of the length of the roof tape in order that the extensometer can be very simply set up. Also, it will be readily apparent that the roof tape can be reeled out to varying lengths to provide for measurement of roofs that are of varying heights. The measurement of height is only limited by the full length of the tape carried upon the reel 38. It will also be apparent that in cases where the roof and the floor are separated by less than the height of the average man that the bottom tape may be shortened by appropriate connection of the pin 107 to the end of the floor tape connected to the counterweight frame.

In the initial adjustment, it will be understood that the contacting member 110 physically engages and depresses the plunger 108. It is unimportant as to the extent of depression as relative change in the measurement to be made between the roof and the floor is only measured from the time after the instrument is set up. In most instances the relative change will be measured in thousandths of an inch and for this reason the initial indication may be near the zero inch level for the indicating member 114 upon the indicating rule 112 or it may be near the four inch level. A greater range, of course, will be provided where there is only a slight depression of the dial plunger 108 so that the indicating member 114 is fairly close to the zero or one inch or two inch position on the rule 112.

There is shown in FIGURE 1 a typical position of the needle upon the dial 44 at the time of installation. In this position, which may be a starting position in a typical example, the indication upon the meter is about thirty-eight thousandths of an inch. Any increase in the reading of the dial and the indicating rule 112 will indicate a sag between the roof and the floor. For purposes of example, there is shown in FIGURE 7 such a change where the plunger 108 has been depressed due to the sag in the roof and the relative movement of the counterweight frame 42 upon the tracks 50 and 52. This movement, which is exaggereated, shows an indication upon the dial of almost five revolutions of the needle as the indicating element 114 is almost up to the five tenths of an inch mark and the needle on the dial reads 86. This will correspond to an actual meter reading of 0.486 of an inch or 486 thousandths. The actual sag then is determined by subtracting the meter reading of .038 of an inch at the position of FIGURE 1 from .486 in the position shown in FIGURE 7. This shows an actual relative movement of .448 inch. It will be understood that the amount of sag here is exaggerated as in normal occurrences the sag will be of a lesser degree. However, under some instances and in some applications of the device the sag may be greater or lesser.

In the actual operation of the tape extensometer it will be understood that the counterweight frame 42 is the only moving element upon the tracks 50 and 52. All of the other members, such as the reel frame 76 and the dial support 105, are securely locked upon the frame and tracks. The roof tape, of course, is securely locked by the locking pin 64. Accordingly, when the roof sags a small amount the entire extensometer frame will move downwardly. This in turn lowers the shaft 88 of the counterweight pulley 84 as it is securely attached to the frame. Therefore, as the counterweight pulley moves downwardly the counterweight frame will also move downwardly relative to the extensometer frame since the counterweights 103 and 104 tend to keep the floor tape 32 taut due to the securing of the hook 118 to the floor plug 34. The relative downward movement of the counterweight frame with respect to the extensometer frame as caused by the roof sag will move the contacting member 110 of the counterweight frame downwardly against the dial plunger 108 to the same extent as the sag. Thus, the actual relative movement will be read directly upon the dial 44 and the indicating rule 112 as the above-mentioned relative movement takes place.

By means of readings taken at frequent intervals, the relative movement between the floor and roof can accordingly be determined. The counterweights 103 and 104 provide for an exact degree of tensioning upon the tape of the system. Thus, the dead weight employed always tensions the extensometer to the same degree rather than by the use of springs which may vary in force despite efforts at calibration.

Accordingly, it will be seen that there has been provided by this invention a tape extensometer which may be very simply installed and used to measure the relative difference between a roof and a floor station. The tape extensometer can be used over a wide range of elevations and can be very simply operated. The extensometer is of a high degree of accuracy occasioned by the use of the steel tapes and dead weight counterweight balance employed. The device is rugged and simple and has been found to be of great value in the field.

Various changes and modifications may be made within this invention as will be readily apparent to those skilled in the art. Such changes and modifications are within the scope and teaching of this invention as defined by the claims appended hereto.

What is claimed is:

1. A tape extensometer for measuring roof sag comprising an extensometer frame, a roof tape having means for connecting it at one end to the extensometer frame and having means for connecting it to a roof at the other end, a floor tape having means at one end for connecting it to a floor and means at the other end for maintaining the extensometer under a constant tension comprising a counterweight, a counterweight pulley supporting said floor tape, and means for indicating relative movement between the floor and roof by movement of the counterweight with respect to the extensometer frame.

2. A tape extensometer for measuring roof sag comprising an extensometer frame, a roof tape having means for connecting it at one end to the extensometer frame and having means for connecting it to a roof at the other end, said roof tape being supported upon the extensometer frame by a reel and being extensible therefrom to selective lengths, a floor tape having means at one end for connecting it to a floor and means at the other end for maintaining the extensometer under a constant tension comprising a counterweight, a counterweight pulley supporting said floor tape, and means for indicating relative movement between the floor and roof by movement of the counterweight with respect to the extensometer frame.

3. A tape extensometer for measuring roof sag comprising an extensometer frame, a roof tape having means for connecting it at one end to the extensometer frame and having means for connecting it to a roof at the other end, said roof tape being supported upon the extensometer frame by a reel and being extensible therefrom to selective lengths, a floor tape having means at one end for connecting it to a floor and means at the other end for maintaining the extensometer under a constant tension comprising a counterweight, a counterweight pulley supporting said floor tape, and means for indicating relative movement between the floor and roof by movement of the counterweight with respect to the extensometer frame, the last named means comprising an indicating dial having a dial actuating plunger actuated by relative movement of said counterweight with respect to said extensometer frame.

4. A tape extensometer for measuring roof sag comprising an extensometer frame, a roof tape having means for connecting it at one end to the extensometer frame and having means for connecting it to a roof at the other end, said roof tape being supported upon the extensometer frame by a reel and being extensible therefrom to selective lengths, said means for connecting the roof tape to the extensometer frame comprising a connecting pin adapted to pass through holes provided in the roof tape at intervals along its length and be secured upon the extensometer frame, a floor tape having means at one end for connecting it to a floor and means at the other end for maintaining the extensometer under a constant tension comprising a counterweight, a counterweight pulley supporting said floor tape, and means for indicating relative movement between the floor and roof by movement of the counterweight with respect to the extensometer frame.

5. A tape extensometer for measuring roof sag comprising an extensometer frame, a roof tape having means for connecting it at one end to the extensometer frame and having means for connecting it to a roof at the other end, a floor tape having means at one end for connecting it to a floor and means at the other end for maintaining the extensometer under a constant tension comprising a counterweight and a counterweight frame supporting the counterweight and the counterweight frame being guided by said extensometer frame and relatively movable in a vertical direction thereupon, a counterweight pulley secured to said extensometer frame for supporting said floor tape, and means for indicating relative movement between the floor and roof by movement of the counterweight with respect to the extensometer frame.

6. A tape extensometer for measuring roof sag comprising an extensometer frame, a roof tape having means for connecting it at one end to the extensometer frame and having means for connecting it to a roof at the other end, a floor tape having means at one end for connecting it to a floor and means at the other end for maintaining the extensometer under a constant tension comprising a counterweight and a counterweight frame supporting the counterweight and the counterweight frame being guided by said extensometer frame and relatively movable in a vertical direction thereupon, a counterweight pulley secured to said extensometer frame for supporting said floor tape, and means for indicating relative movement between the floor and roof by movement of the counterweight with respect to the extensometer frame, the last named means comprising an indicating dial having a dial actuating plunger actuated by relative movement of said counterweight with respect to said extensometer frame.

7. A tape extensometer for measuring roof sag comprising an extensometer frame, a roof tape having means for connecting it at one end to the extensometer frame and having means for connecting it to a roof at the other end, said roof tape being supported upon the extensometer frame by a reel and being extensible therefrom to selective lengths, said means connecting the roof tape to the extensometer frame comprising a connecting pin adapted to pass through holes provided in the roof tape at intervals along its length and be secured upon the extensometer frame, a floor tape having means at one end for connecting it to a floor and means at the other end for maintaining the extensometer under a constant tension comprising a counterweight and a counterweight frame supporting the counterweight and the counterweight frame being guided by said extensometer frame and relatively movable in a vertical direction thereupon, a counterweight pulley secured to said extensometer frame for supporting said floor tape, and means for indicating relative movement between the floor and roof by movement of the counterweight with respect to the extensometer frame.

8. A tape extensometer for measuring roof sag comprising an extensometer frame, a roof tape having means for connecting it at one end to the extensometer frame and having means for connecting to a roof at the other end, a floor tape having means at one end for connecting it to a floor and means at the other end for maintaining the extensometer under a constant tension comprising a counterweight, a counterweight pulley supporting said floor tape, and means for indicating relative movement between the floor and roof by movement of the counterweight with respect to the extensometer frame, the last named means comprising an indicating dial having a dial actuating plunger actuated by relative movement of said counterweight with respect to said extensometer frame, said dial actuating plunger being provided with an indicating element and rule for indicating plural revolutions of a dial needle upon the dial.

9. A tape extensometer for measuring roof sag comprising an extensometer frame having a pair of parallel tracks and top and bottom plate members, a roof tape having means for connecting it at one end to the extensometer frame and means for connecting it to a roof at the other end, a floor tape having means at one end for connecting it to a floor and means at the other end for maintaining the extensometer under a constant tension comprising a counterweight, the last named means comprising a counterweight frame relatively movable upon said tracks, said counterweight frame supporting said counterweight, a counterweight pulley secured to said extensometer frame for supporting said floor tape, and means for indicating relative movement between the floor and roof by movement of the counterweight with respect to the extensometer frame.

10. A tape extensometer for measuring roof sag comprising an extensometer frame having a pair of parallel tracks and top and bottom plate members, a roof tape having means for connecting it at one end to the extensometer frame and means for connecting it to a roof at the other end, said roof tape being supported upon a reel removably secured to the tracks of the extensometer frame and being extensible therefrom to selective lengths, a floor tape having means at one end for connecting it to a floor and means at the other end for maintaining the extensometer under a constant tension comprising a counterweight and a counterweight frame relatively movable upon said tracks, and supporting the counterweight, a counterweight pulley secured to said extensometer frame and supporting said floor tape, and means for indicating relative movement between the floor and roof by movement of the counterweight with respect to the extensometer frame.

11. A tape extensometer for measuring roof sag comprising an extensometer frame having a pair of parallel tracks and top and bottom plate members, a roof tape having means for connecting it at one end to the extensometer frame and means for connecting it to a roof at the other end, said roof tape being supported upon a reel removably secured to the tracks of the extensometer frame and being extensible therefrom to selective lengths, said means for connecting the roof tape to the extensometer frame comprising the frame top plate member being provided with a slot receiving said tape and a connecting pin adapted to pass through holes provided in the roof tape at intervals along its length and be fastened through registering holes provided in said plate member, a floor tape having means at one end for connecting it to a floor and means at the other end for maintaining the extensometer under a constant tension comprising a counterweight and a counterweight frame relatively movable upon said tracks, and supporting the counterweight, a counterweight pulley secured to said extensometer frame and supporting said floor tape, and means for indicating relative movement between the floor and roof by movement of the counterweight with respect to the extensometer frame.

References Cited in the file of this patent

UNITED STATES PATENTS

| | | |
|---|---|---|
| 1,427,773 | Barrett | Sept. 5, 1922 |
| 2,445,340 | Thomas | July 20, 1948 |

FOREIGN PATENTS

| | | |
|---|---|---|
| 773,901 | Great Britain | May 1, 1957 |